United States Patent [19]

Goof

[11] 4,071,039
[45] Jan. 31, 1978

[54] FLUID PRESSURE CONTROLLED VALVE ASSEMBLY

[76] Inventor: Sven Karl Lennart Goof, Gammel Strandvej 236 B, Humlebaek, Denmark, DK-3050

[21] Appl. No.: 667,832

[22] Filed: Mar. 17, 1976

[30] Foreign Application Priority Data

Mar. 20, 1975 Denmark .............................. 1186/75

[51] Int. Cl.$^2$ .......................................... G05D 16/06
[52] U.S. Cl. .................................... 137/87; 137/494; 251/5; 251/7
[58] Field of Search .............. 137/494, 87, 98; 251/5, 251/7

[56] References Cited

U.S. PATENT DOCUMENTS

| 2,471,623 | 5/1949 | Hubbell | 251/7 X |
| 2,556,689 | 6/1951 | Grove | 251/7 |
| 2,827,919 | 3/1958 | Rice et al. | 251/7 X |
| 2,985,192 | 5/1961 | Taylor | 251/7 X |
| 3,187,774 | 6/1965 | Leigh et al. | 251/7 X |
| 3,213,882 | 10/1965 | Beatty | 251/7 X |
| 3,450,152 | 6/1969 | Quellette | 251/5 X |
| 3,468,342 | 9/1969 | Craft | 251/5 X |
| 3,578,885 | 5/1971 | Alton | 251/7 X |
| 3,582,284 | 6/1971 | Hamshere et al. | 251/7 X |
| 3,974,858 | 8/1976 | Nielsen | 251/7 X |

*Primary Examiner*—Alan Cohan
*Assistant Examiner*—Gerald A. Michalsky
*Attorney, Agent, or Firm*—Fleit & Jacobson

[57] ABSTRACT

A valve assembly of the type, wherein a first end of a movable plunger is adapted to collapse or compress a first tube length against an opposite tube backing or support structure in order to regulate or vary the flow conditions of a fluid in this first tube length, is equipped with a control assembly comprising a second interiorly pressurized tube length and a second or opposite end of the plunger engages this second tube length. Thus, by appropriately proportioning the sizes of the contact faces between the respective plunger ends and the tube length associated therewith it will be possible to control the flow conditions in one of the tube lengths responsive to the fluid pressure in the other tube length whereby various valve or regulating functions may be performed by the valve. The two tube lengths may be parts of one and the same tube whereby additional valve or regulating functions may be performed.

9 Claims, 8 Drawing Figures

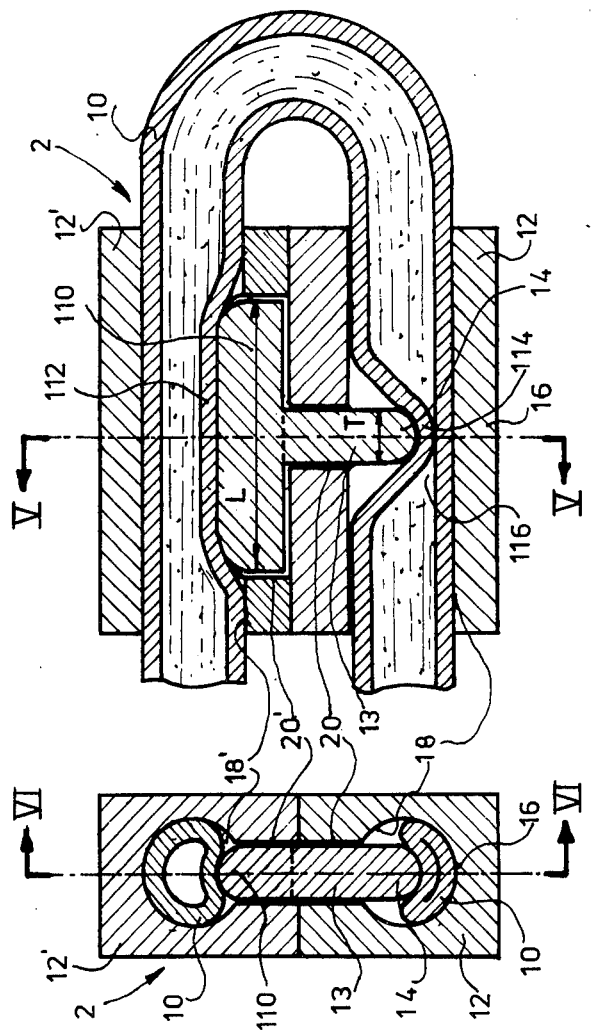

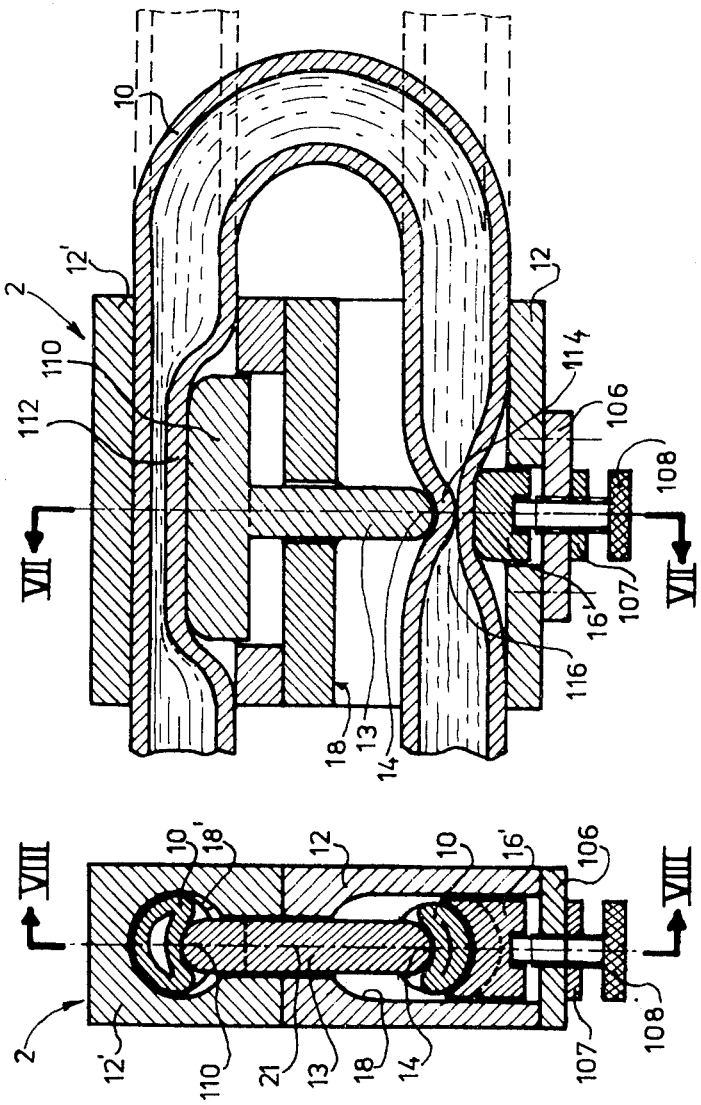

FLUID PRESSURE CONTROLLED VALVE ASSEMBLY

BACKGROUND OF THE INVENTION

This invention relates generally to a fluid pressure controlled valve assembly and, more particularly, to a unique valve assembly in which a first tube length is collapsed or compressed responsive to the fluid pressure in a second tube length whereby fluid flow through the first tube length may be varied or stopped.

In the past, conventional valves, which utilize sliding or rotational movement, have been used to stop, control or regulate flow through a tube. However, such valves frequently added contamination, such as valve lubricants, seal particles, etc., to the fluid when actuated. Furthermore, such valves frequently did not have the capability of sealing fluids containing solids which could prevent proper seating of the valve of its valve seat. In addition, such solids contained in the fluid could cause the valve to "hang" and thereby disturb its proper operation.

Moreover, conventional valves of the type here contemplated are generally rather complicated as to structure, installation, maintenance and repairs.

SUMMARY OF THE INVENTION

Accordingly, it is an object of this invention to provide a simple valve assembly which is accurately responsive to changes in pressure in a fluid pressurized tube length which may be a part of the same tube as that controlled by the valve, or which may be a part of a separate tube.

Another object of this invention is to provide a valve assembly which provides for a positive and complete closure of the valve as well as a controlled partial closure of the valve, there being practically no opportunity for the development of leaks during the life of the valve.

Still another object of this invention is to provide a valve which will be accurately responsive to pressure changes and adjustable through wide limits as to its action in response to pressure changes.

Yet another object is to provide a valve assembly, which is relatively inexpensive and practicable to manufacture, which is simple, convenient and dependable in use, and which will give generally efficient and durable service.

These and other objects are implemented by the valve assembly according to the invention comprising a valve body having a first bore or passage therethrough, said first bore being formed to receive a first tube length therein, and a first transverse bore or passage intersecting said first bore; and a plunger means having a shank portion and a head portion, said shank portion being inserted in said first transverse bore, an end or thrust pad portion of said shank portion engaging said first tube for collapsing or compressing the same against a tube support or backing means in said valve body, when said plunger means is moved in a first direction in said transverse bore. The valve assembly according to the present invention is characterized by further comprising a control body having a second bore or passage therethrough being formed to receive a second tube length therein, and a second transverse bore or passage intersecting said second bore, said control body being disposed and secured with said second transverse bore being aligned with said first transverse bore, and said plunger head portion being inserted in said second transverse bore engaging said second tube length for collapsing or compressing the same when said plunger means is moved in the opposite direction in said transverse bore.

By appropriately proportioning the sizes of the contact faces between the respective plunger ends and the tube lengths associated therewith it will be possible to control the flow conditions in one of the tube lengths responsive to the fluid pressure in the other tube length whereby various regulating functions may be performed by the valve assembly according to the invention.

According to the invention, the two tube lengths may be parts of different and separate tubes which may have different sizes. However, according to the invention, the two tube lengths may also be parts of one and the same tube whereby additional regulating functions may be performed by the valve assembly of the invention.

BRIEF DESCRIPTION OF THE DRAWINGS

The foregoing and other objects and features of this invention will become apparent from the following detailed description taken in connection with the accompanying drawings wherein:

FIG. 5 is a cross sectional view illustrating an embodiment of the valve assembly of the invention having a valve body as that of FIG. 2 or 3 and a control body associated therewith;

FIG. 6 is a sectional view taken along line VI—VI of FIG. 5;

FIG. 7 is a cross sectional view similar to that of FIG. 5 but showing another embodiment of the invention; and FIG. 8 is a sectional view taken along line VIII—VIII of FIG. 7.

DESCRIPTION OF THE PREFERRED EMBODIMENTS

Figure 1:
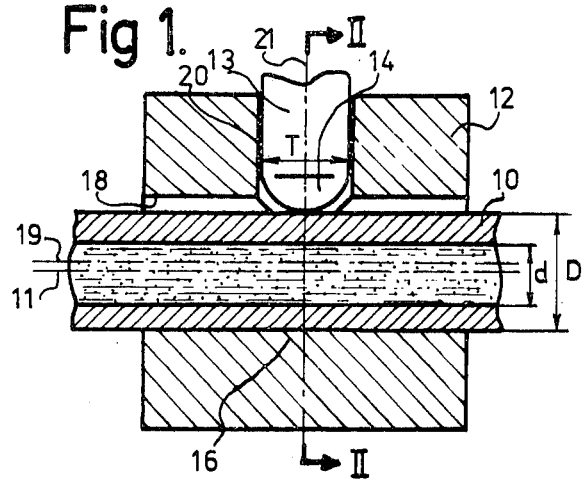
FIG. 1 is a sectional side elevation schematically illustrating the valve body being a part of the valve assembly of the invention.

Referring now to the drawings, the fluid pressure controlled valve assembly of the present invention is designated generally by the reference numeral 2. FIGS. 5 and 6 illustrate one embodiment of the valve assembly, and as shown there the valve assembly 2 comprises a valve body 12 and a control body 12'.

The valve body 12 is illustrated separately and schematically in FIG. 1. As illustrated the valve of the invention is of the type which in its fully open condition as shown provides free or unobstructed passage through the valve body 12 in which a plunger 13 is movably inserted. The flow passage of the valve is a collapsible tube 10 inserted in the valve body and having an inner diameter $d$ and an outer diameter $D$.

The plunger 13 has an end or thrust pad 14 engaging the tube 10 for compressing or collapsing the tube against a tube support or backing structure 16 in the valve body, when the plunger 13 is moved towards the backing structure 16 as will be described in the following.

The valve body 12 has a first bore 18 extending therethrough and having a diameter adapted to the outer diameter D of the tube 10. As shown in FIG. 1, the tube 10 is inserted in the bore 18 with the tube axis 11 extending generally parallel with the axis 19 of the bore 18.

The end or thrust pad 14 of the plunger 13 has a face contacting the tube 10 and having a transverse dimension or diameter T being greater than or equal to the inner diameter $d$ of the tube, and the thrust pad 14 is movably inserted in a second bore 20 in the valve body, the axis 21 of the bore 20 being generally at right angles to the axis 19 of the bore 18 and intersecting the same. The transverse dimension or diameter T of the contact face of the thrust pad or plunger end 14 is shown as being smaller than the outer diameter D of the tube 10.

Figure 2:
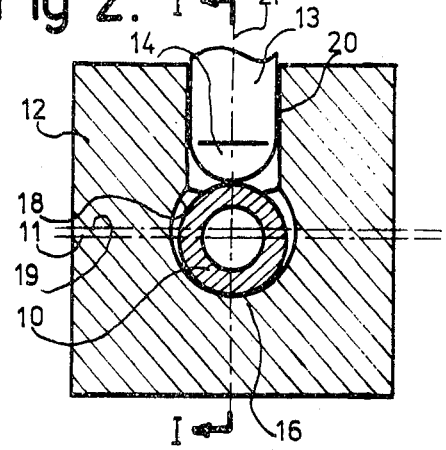
FIG. 2 is a sectional view taken along lines II—II of FIG. 1.
Figure 3:
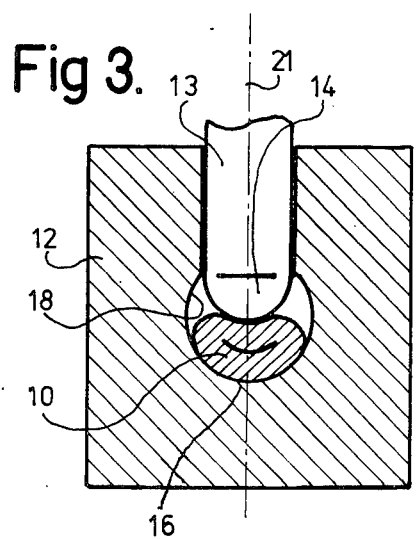
FIG. 3 is a sectional view similar to FIG. 2 but showing the tube in a collapsed condition.

FIG. 2 is a sectional view taken along line II—II of FIG. 1, and as will appear therefrom the tube may have an outer diameter being smaller than the diameter of the bore 18 in the free state shown. FIG. 3 shows the situation when the valve is closed after that the thrust pad 14 has been moved towards the tube support 16 by the plunger 13. The radius of curvature of the contact face on the thrust pad 14 depends as shown on the radius of curvature of the bore 18 at the tube support 16 and of the wall thickness of the tube 10. If the thrust pad 14 has a contact face having a radius of curvature $\rho_p$, and if the bore 18 has a radius of curvature $\rho_b$ at the tube support 16, a satisfactory collapse of the tube 10 in the closed position of the valve will be obtained, when the transverse dimension or diameter T of the thrust pad is greater than the inner diameter d but smaller than the outer diameter D of the tube 10, and when $$\rho_t = \rho_b - 2s$$

wherein $s$ corresponds to the thickness of the tube wall in the collapsed state of the tube. As a result thereof, the tube material will during the collapse nowhere be stressed more than necessary by the occurring compressive loads, thus ensuring a life of the tube 10 being as long as possible. Moreover, the collapse of the tube 10 to close the valve may happen at the lowest possible compressive forces from the plunger 13, since the wall of the tube 10 nowhere is compressed more than necessary which has particular importance in connection with the areas of the tube being most exposed to stresses during the collapse, and wherein the greatest deformations occur.

Figure 4:
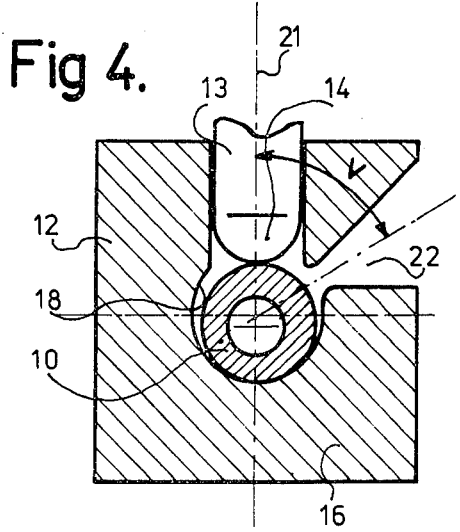
FIG. 4 is a sectional view similar to FIG. 2 but illustrating an embodiment having a slot for introducing the tube into the interior of the valve body.

The valve body illustrated in FIGS. 1-3 is adapted to have the tube 10 inserted through one end of the bore 18 and out through the other end of the bore. In certain pressurized circuits comprising several valves this may, however, be inexpedient, for example; when an additional valve is to be included in the circuit. As shown in FIG. 4, the valve body 12 may, in order to avoid having to remove the tube from all valves in a circuit when an additional valve is to be included therein, be provided with a lateral slot 22 extending along the whole length of the valve body bore 18, the lateral slot having a central plane forming an acute angle V with the axis 21 of the second bore 20. The width of the lateral slot is smaller than the free outer diameter D of the tube 10. An additional valve assembly according to the invention may therefore, be inserted in an already established tube circuit, if the tube 10 is compressed and possibly stretched a little at the location where the further valve assembly is to be located, whereafter the tube 10 easily can be inserted in the tube bore 18 of the valve mechanism through the lateral slot 22. With a location and an arrangement of the lateral slot 22 as shown in FIG. 4, the tube 10 cannot be pressed out through the lateral slot 22 during the normal operation of the valve assembly.

Both ends of the tube 10 can moreover be connected with stationary tube installations, other tubes or valves of other kinds by means of conventional means.

FIGS. 5 and 6 illustrate a first embodiment of the valve assembly according to the invention. As illustrated, the assembly comprises a valve body 12 and a control body 12' secured in position thereon by conventional means (not shown) such as clamping screws or clamping straps. The control body 12' is substantially of the same structure as that of the valve body 12 described above, apart from the fact that the transverse bore 20' of the control body is an elongated recess, into which an end of the plunger 13 in the form of a head 110 can be inserted to engage a tube in the tube bore 18' of the control body.

In the embodiment illustrated, the tube 10 is first inserted through the valve body bore 18 and thereafter through the control body bore 18'. The plunger end 14 engages the tube in a first area 114, while the opposite plunger head 110 engages the tube 10 in a second area 112. Thus, the plunger 13 constitutes a pressure transferring means between the two tube portions 112 and 114 through the two plunger ends or thrust pads 14,110 engaging the respective tube portions. The plunger head which engages the second tube portion 112 in the control body 12' comprises a surface abutting the tube along a length L in the axial direction of the bore 18', while the plunger end 14 engaging the first tube portion 114 comprises a surface abutting the tube along a length T in the axial direction of the bore 18.

In the embodiment illustrated the length L is greater than the length T, and thereby a valve assembly is provided wherein the flow condition is determined by a throat 116 in the interior of the tube. This throat is provided by the plunger end 14 in the tube area 114, and the size of the throat is continuously determined by the total compressive force acting on the plunger head 110.

The embodiment illustrated may be used as a pressure decreasing valve, if the inlet pressure occurs in the tube area 112, and if the ratio between the lengths T and L is adapted to the desired outlet pressure which occurs downstream of the throat 116. With such an arrangement a decrease of the throat 116 will take place during an increasing pressure in the second part 112 of the tube, until the tube is completely collapsed in the area 114, and thereafter the valve will remain shut off until the inlet pressure once more drops to a predetermined value. Consequently, the valve assembly may also serve as a safety valve preventing that the outlet pressure exceeds a certain limit, and furthermore, the valve assembly may serve as a shut-off valve, because the valve will also be closed when the pressure medium consumption in the outlet pipe of the assembly exceeds a certain limit.

If, on the other hand, the inlet pressure is connected with the first portion 114 of the tube in the embodiment shown in FIGS. 5 and 6, the valve assembly will get a reduction valve function. The outlet pressure thus, cannot be greater than a predetermined multiple of the inlet pressure, and if, for example, the outlet tube is shut off or is clogged up, the pressure in the other portion 112 will rise, whereby the throat 116 will be shut off as a result of the pressure transformation which occurs between the greater plunger head 110 and the smaller plunger end 14.

The FIGS. 7 and 8 illustrate another embodiment of a valve assembly according to the invention. In this embodiment the tube supporting structure 16 in the valve body bore 18 opposite to the thrust pad 14 is adjustably mounted. The adjustment of the tube supporting structure 16 takes place by means of a traverse 106 with a threaded hole and secured to the valve body 12, in which threaded hole a set screw 108 is inserted. A counter nut 107 may serve to lock the set screw 108 in different positions. In this embodiment it is for instance possible to change the ratio between the outlet pressure and the inlet pressure by displacement of the tube supporting structure 16'. In the embodiment illustrated in FIGS. 7 and 8 the valve body bore 18 moreover, has plane and parallel side walls to enable the tube supporting structure 16' to be displaced between two extreme positions, of which one is shown in solid lines in FIG. 7, while the other is shown in dotted lines.

In the embodiments of the valve assembly according to the invention described above and schematically illustrated on the drawings one and the same tube 10 is inserted both through the valve body bore 18 and the control body bore 18'. Obviously, different and separate tubes can be used in connection with the valve body and the control body, respectively as indicated in dotted line in FIG. 8. Thereby the pressure in one of these separate tubes may control the flow conditions in the other tube. Moreover, it is not necessary that the two body bores 18 and 18' extend parallelly as shown in FIGS. 6 and 8. The two bores may extend skewly, for example, crossing each other without intersecting.

Furthermore, it is not necessary that the tube lengths of the respective bores 18 and 18' have the same diameter. If, for example, the tube portion 114 has a smaller inner diameter than the tube portion 112, it will be possible to close the throat 116 completely by means of the thrust pad 14 at a lower pressure in the tube portion 112. These modifications of the instant invention are illustrated in phantom in FIG. 8. In a valve assembly according to the invention and used as pressure decreasing valve the pressure decrease ratio may consequently be increased.

Finally, the valve body bore 18 may also be provided with a generally rectangular cross section, whereby the tube support structure 16 might have a plane surface abutting the tube 10. If so, the bore 18 must, however, have a width, at least at the tube support structure 16, which allows the tube 10 to be flattened during the collapse thereof.

The tube material may be of such a nature that it resiliently seeks towards the circular shape of the tube, but the tube may also be made of a flexible material which is inflated to a circular shape by the pressure prevailing in the interior of the tube.

Based on the above description, it will be appreciated that the present invention provides a pressure controlled valve assembly being useful in connection with a great variety of hydraulic or pneumatic systems.

Obviously, further variations from the embodiments represented in the drawings and described above may be resorted to without departure from the spirit of this invention, and the scope thereof should be determined only as limited by a proper interpretation of the terms used in the following claims.

I claim:

1. A fluid pressure controlled valve assembly comprising a valve body having a first bore therethrough, said first bore being formed to receive a first tube length therein, and a first transverse bore intersecting said first bore; a plunger means having a shank portion and a head portion, said shank portion being inserted in said first transverse bore, an end of said shank portion engaging said first tube for collapsing the same against a tube support in said valve body, when said plunger means is moved in a first direction in said transverse bore responsive to pressure forces acting on said head portion; and a control body having a second bore therethrough being formed to receive a second tube length therein, and a second transverse bore intersecting said second bore, said control body being disposed and secured to said valve body with said second transverse bore being aligned with said first transverse bore, and said plunger head portion being inserted in said second transverse bore engaging said second tube length for collapsing the same when said plunger means is moved in the opposite direction in said transverse bore responsive to pressure forces acting on said shank portion end.

2. A valve assembly as defined in claim 1, wherein said tube engaging part of said plunger head portion has dimensions in the longitudinal direction of said second bore being larger than the dimensions in the longitudinal direction of said first bore of said tube engaging end of said plunger shank portion.

3. A valve assembly as defined in claim 1, wherein said first tube length and said second tube length are parts of separate tubes extending through said first valve body bore and through said second control body bore, respectively.

4. A valve assembly as defined in claim 3, wherein one of said separate tubes has an inner diameter smaller than the inner diameter of the other tube.

5. A valve assembly as defined in claim 3, wherein said tube support in said valve body is adjustable.

6. A valve assembly as defined in claim 1, wherein a tube of flexible resilient material is inserted through said first valve body bore and thereafter through said second control body bore.

7. A valve assembly as defined in claim 6, wherein said tube support in said valve body is adjustable.

8. A valve assembly as defined in claim 1, wherein said tube support in said valve body is adjustable.

9. A fluid pressure controlled valve assembly comprising: a body portion; a first bore extending through said body portion; a second bore spaced from said first bore, extending through said body portion; a third bore in said body portion, extending between and in communication with said first bore and said second bore; and plunger means mounted in said third bore, having a control end and a head end, said control end formed to continually contact a first tube length received in said first bore, said head end formed to continually contact a second tube length received in said second bore, and said plunger means being movable toward and away from said first tube length responsive to pressure forces exerted on said head end by said second tube length so as to transfer corresponding compressive forces to said first tube length through said control end.

* * * * *